United States Patent Office 3,408,364
Patented Oct. 29, 1968

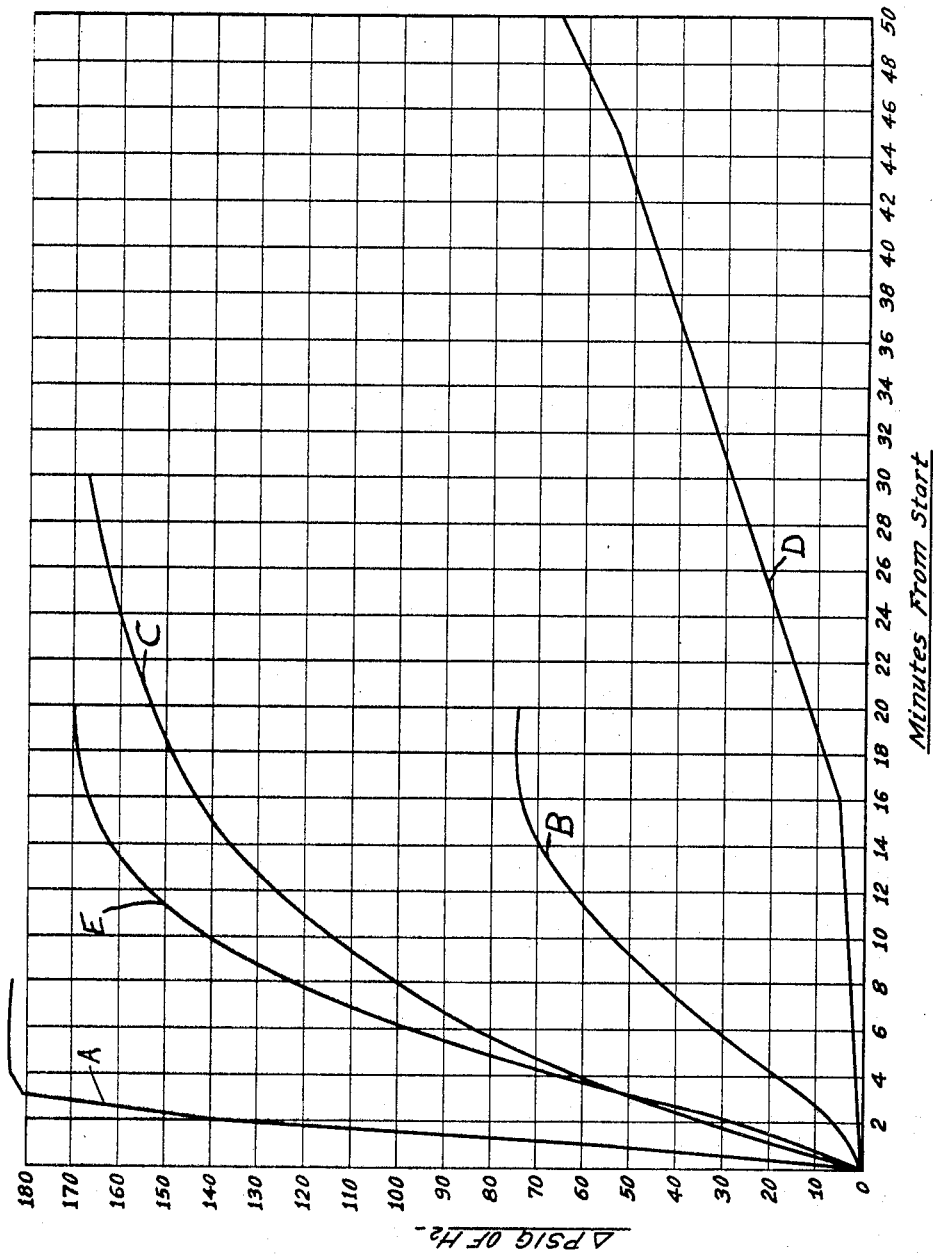

3,408,364
PREPARATION OF CYCLIC ETHERS
Paul N. Rylander and Duane R. Steele, Newark, N.J., assignors to Engelhard Industries, Inc., Newark, N.J., a corporation of Delaware
Filed May 26, 1965, Ser. No. 459,010
4 Claims. (Cl. 260—345.1)

ABSTRACT OF THE DISCLOSURE

Cyclic ethers are prepared from cyclic diones by hydrogenation of the dione in the presence of an iridium catalyst. The cyclic ether products of the disclosed process have utility as solvents for copolymers of the perfluorochloroolefins.

---

This invention relates to the preparation of cyclic ethers and more especially to a new and improved process for the hydrogenation of acyclic gamma or delta diones to produce the corresponding cyclic ether characterized by a considerably enhanced hydrogenation rate.

The process of this invention involves contacting an acyclic dione of the formula

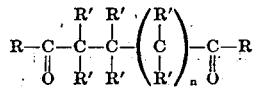

wherein each R is the same or different lower alkyl, i.e. 1–4 C inclusive alkyl, or aryl radical, each R" is a hydrogen atom or the same or different lower alkyl radical, i.e. 1–4 C inclusive alkyl, and $n$ is an integer from 0–1, with hydrogen in the presence of an iridium catalyst. By reason of the iridium catalyst, the hydrogenation is effected at a considerably higher rate to produce the corresponding cyclic ether than is the case when utilizing a rhodium, platinum, palladium or ruthenium catalyst.

Acyclic diones suitable as feed stocks herein include acyclic gamma diones of the formula

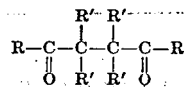

wherein each R is lower alkyl, i.e. 1–4 C inclusive alkyl, or mono- or bicyclic carbocylic or heterocyclic aryl and each R" is hydrogen or lower alkyl, i.e. 1–4 C inclusive alkyl. Exemplary of such diones are 2,5-hexanedione, 2,5-octanedione, 3,6-octanedione, 2,5-heptanedione, 1,6-diphenyl - 2,5 - hexanedione, 1-phenyl-2,5-hexanedione, 4-methyl-2,5-hexanedione, 3,4-dimethyl-2,5-hexanedione, 3,3-dimethyl-2,5-hexanedione, 3,3-dimethyl-4,4-diethyl-2,5-hexanedione, 3,3-dimethyl-2,5-hexanedione, 1-α-naphthyl-2,5-hexanedione and 1-β-pyridyl-2,5-hexanedione. Product tetrahydrofurans obtained herein by the hydrogenation of the above γ-diketones are respectively 2,5-dimethyltetrahydrofuran,
2-methyl-5-propyltetrahydrofuran,
2,5-diethyltetrahydrofuran,
2-methyl-5-ethyltetrahydrofuran,
2,5-dibenzyltetrahydrofuran,
2-methyl-5-benzyltetrahydrofuran,
2,3,5-trimethyltetrahydrofuran,
2,3,4,5-tetramethyltetrahydrofuran,
2,3,3,5-tetramethyl-4,4-diethyltetrahydrofuran,
2,3,3,5-tetramethyltetrahydrofuran,
2-methyl-5-α-naphthylmethyltetrahydrofuran and
2-methyl-5-β-pyridylmethyltetrahydrofuran.

Those substituents such as phenyl, napthyl or pyridyl which can temselves be reduced, may be reduced if the reduction be allowed to continue or some reduction of such substituent can occur concomitantly with the ring reduction.

Delta acyclic diones of the formula

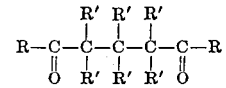

wherein each R is the same or different lower alkyl, i.e. 1–4 C inclusive alkyl, or mono- or bicyclic carbocyclic or heterocyclic aryl and each R' is hydrogen or the same or different lower alkyl, i.e. 1–4 C inclusive alkyl, are also suitable feed stocks in accordance with this invention for production of the corresponding cyclic ethers. Exemplary of the delta acyclic diones are 2,6-heptanedione,
2,6-octanedione,
3,3-dimethyl-2,6-octanedione,
3,4-dimethyl-2,6-heptanedione,
3,5-dimethyl-2,6-heptanedione,
3-methyl-4-ethyl-2,6-octanedione,
3-n-butyl-2,6-heptanedione,
4-isopropyl-2,6-heptanedione,
3-methyl-2,6-heptanedione,
4-methyl-2,6-heptanedione,
2-methyl-3,7-nonanedione,
1,7-diphenyl-2,6-heptanedione,
1-β-pyridyl-2,6-heptanedione and
1-α-naphthyl-2,6-heptanedione.

Product tetrahydropyrans obtained herein by the hydrogenation of the above δ-diketones are respectively 2,6-dimethyltetrahydropyran,
2-methyl-6-ethyltetrahydropyran,
2,3,3-trimethyl-6-ethyltetrahydropyran,
2,3,4,6-tetramethyltetrahydropyran,
2,3,5,6-tetramethyltetrahydropyran,
2,3-dimethyl-4,6-diethyltetrahydropyran,
3-n-butyl-2,6-dimethyltetrahydropyran,
4-isopropyl-2,6-dimethyltetrahydropyran,
2,3,6-trimethyltetrahydropyran,
2,4,6-trimethyltetrahydropyran,
2-isopropyl-6-ethyltetrahydropyran,
2,6-dibenzyltetrahydropyran,
2-methyl-6-β-pyridylmethyltetrahydropyran and
2-methyl-6-α-naphthylmethyltetrahydropyran.

Hydrogenation conditions of temperature and pressure for the synthesis of the cyclic ethers herein are a temperature from about 25° C.–300° C., and a pressure from about 1–1000 atmospheres. The hydrogen is supplied to the reaction zone in the stoichiometric amount or in excess of the stoichiometric amount for reaction with the particular dione to produce the corresponding cyclic ether, preferably the stoichiometric excess.

The iridium catalyst is supported or unsupported, preferably the former. Exemplary of solid catalyst support materials utilizable for preparing the supported catalyst are carbon, alumina, silica, kieselguhr, pumice and calcium carbonate. The support may be in the form of pellets, granules, extruded shapes or powder. The supported iridum catalyst can be prepared by precipitating a reducible compound of iridum, e.g. iridium oxide, onto the solid support material, by admixing an alkaline material, for instance an aqueous sodium hydroxide solution, with an aqueous solution of iridium chloride having the solid support material therein, followed by contacting the iridium oxide on the support at elevated temperature with a reducing agent, for instance hydrogen gas, to reduce the oxide to iridium metal. The iridium metal is present in the supported catalyst in amount preferably from about 0.1–10% by weight, more preferably about 0.5–5% by weight (based on catalytic metal plus support).

The synthesis of a tetrahydrofuran compound by the hydrogenative cyclization of a gamma dione by its reaction with 2 moles of $H_2$ is represented by the following equation

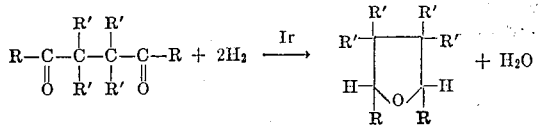

wherein each R and R' are as aforesaid.

Synthesis of a tetrahydropyran by the hydrogenative cyclization of a delta dione by its reaction with 2 moles of $H_2$ is represented by the following equation

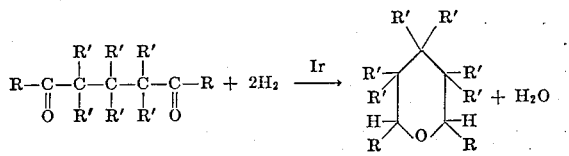

wherein each R and R' are as aforesaid.

The acyclic dione is preferably combined with an organic liquid solvent prior to the catalytic hydrogenating to provide a readily contactable dione for the hydrogenating. Exemplary of such solvents are cyclohexane, acetic acid, lower alkanols, e.g. ethanol and propanol, and ethyl acetate. These solvents are characterized by being inert to the hydrogenation and to the acyclic dione and product cyclic ether.

The hydrogenative cyclization herein can be carried out in a liquid phase batch or static system or continuous flow system, or a vapor phase continuous flow system.

The invention is further illustrated by reference to the following examples. Percentages are by weight.

EXAMPLE I 2,5-hexanedione was hydrogenated in a number of separate test runs using a different platinum group metal as catalyst in each run. The hexanedione was admixed with glacial acetic acid as solvent therefor in an autoclave equipped with a stirrer prior to the hydrogenation of each test run, and the temperature and pressure for each test run was respectively 100° C. and 1000 p.s.i.g. The particular supported platinum group metal of the corresponding test run was also charged into the autoclave in contact with the hexanedione in acetic acid. Hydrogen gas was supplied into the autoclave, from a supply reservoir through a conduit equipped with a pressure regulator. As hydrogen reacted with the hexanedione in the autoclave, additional hydrogen was fed into the autoclave to replace that which had reacted. By this method the hydrogenation rates were obtained at a constant pressure. The following results, set forth in Table I, were obtained.

TABLE I

| Test Run | Catalyst | Amount Catalyst (mg.) | Amount 2,5-hexanedione (ml.) | Amount Solvent (ml.) | Average Rate $H_2$ Uptake (ml./min.) | Catalyst Activity |
| --- | --- | --- | --- | --- | --- | --- |
| 1 | 5% Rh/C | 600 | 5 | 20 | 83 | .08 |
| 2 | 5% Pt/C | 600 | 10 | 10 | 100 | .11 |
| 3 | 5% Pd/C | 600 | 10 | 10 | 24 | .03 |
| 4 | 5% Ru/C | 600 | 10 | 10 | 153 | .16 |
| 5 | 5% Ir/C | 600 | 10 | 10 | 950 | 1.00 |

The "Catalyst Activity" column values were obtained by dividing the rates of $H_2$ uptake, i.e. reacted with the 2,5-hexanedione, when using the indicated catalyst divided by the rate of $H_2$ uptake when using the Ir catalyst. The data of Table I show the considerably greater rate of $H_2$ uptake or hydrogenation when utilizing the supported Ir as catalyst in Test Run 5 than when using the supported Rh, Pt, Pd or Ru as catalyst in Test Runs 1, 2, 3 and 4 respectively. The Table I data also show the considerably greater activity of the Ir catalyst for the hydrogenation. The reaction product when the Ir catalyst was utilized was identified as 2,5-dimethyltetrahydrofuran by infrared spectrogram analysis.

The curves of the graph of the accompanying drawing also show the considerably increased rate of hydrogenation achieved by the supported iridium catalyst of Test Run 5 of this example, designated curve "A" in the graph, over that provided by the supported rhodium catalyst of Test Run 1, designated curve "B" in the graph, the supported platinum catalyst of Test Run 2, designated curve "C" in the graph, the supported palladium catalyst of Test Run 3, designated curve "D" in the graph and the supported ruthenium catalyst, designated curve "E" in the graph. In the graph, a Δ p.s.i.g. of $H_2$, i.e. a pressure drop of the $H_2$ in pounds per square inch gauge of 180-200, designates the reaction of 2 equivalents of $H_2$ with 10 ml. of dione, which is a molar ratio of about 2:1 of $H_2$ to the dione respectively, to produce the corresponding cyclic ether and such was achieved in only about 3-4 minutes with Ir as catalyst (curve "A"). However, with the other platinum group metals as catalysts, the test runs were stopped after considerably longer time periods without 2 moles of $H_2$ having reacted with the dione and due to either the hydrogenation rate falling off considerably (the test runs of curves "E," "C" and "B") or the hydrogenation rate being very slow throughout the test (the test run of curve "D").

EXAMPLE II 2,5-hexanedione was hydrogenated in two separate test runs by a procedure similar to that of Example I execept that ethanol was the solvent instead of acetic acid and the temperature in the test run utilizing a supported Rh as catalyst was 100° C. and in the test run utilizing the supported Ir as catalyst 50° C. The following results, set forth in Table II, were obtained.

TABLE II

| Test Run | Catalyst | Amount Catalyst (mg.) | Amount Substrate (ml.) | Amount Solvent (ml.) | Rate Uptake (ml./minute) |
| --- | --- | --- | --- | --- | --- |
| 6 | 5% Rh/C | 300 | 10 | 20 | 5 |
| 7 | 5% Ir/C | 300 | 5 | 15 | 76 |

The data of Table II show the rate of $H_2$ uptake or hydrogenation was more than 15 times faster with the supported Ir of Run 7 as catalyst than with the supported Rh of Run 6 as catalyst; even though the hydrogenation with the Ir catalyst was effected at a temperature 50° lower than that with the Rh catalyst as increased hydrogenation rates are generally obtained by increasing the hydrogenation temperature. The reaction product of Run 7 was identified as 2,5-dimethyltetrahydrofuran by infrared spectrogram analysis.

EXAMPLE III

Fifty (50) grams of 2,6-heptanedione is dissolved in 250 ml. of methanol, and the resulting solution mixed together with 2 grams of iridium on alumina pellets containing 10 percent of iridium. This mixture is then hydrogenated at 80°-100° C. and 500-1000 p.s.i.g. utilizing the apparatus utilized in Example I, until 2 equivalents of hydrogen are absorbed. The autoclave is then opened, the mixture filtered and the product 2,6-dimethyltetrahydropyran isolated by fractional distillation.

When 3,6-octanedione; 3-methyl-2,6-heptanedione; 4-methyl-2,6-heptanedione or 2-methyl-3,7-nonanedione is hydrogenated when dissolved in methanol and otherwise following the procedure of Example I herein, the product obtained is respectively 2,5-diethyltetrahydrofuran; 2,3,6-trimethyltetrahydropyran; 2,4,6 - trimethyltetrahydropyran; or 2-isopropyl-6-ethyltetrahydropyran. The product cyclic ether in each case is isolated from the reaction product mixture by fractional distillation.

What is claimed is:

1. In a process for the preparation of cyclic ethers wherein an acyclic dione of the formula

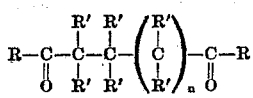

wherein each R is selected from the group consisting of lower alkyl and aryl, each R' is selected from the group consisting of hydrogen and lower alkyl and $n$ is an integer from 0–1, is hydrogenated and cyclized by contacting with hydrogen in the presence of a hydrogenation catalyst at a temperature from about 25–300° C. and a pressure from 1–1000 atmospheres, the improvement of using iridium as the hydrogenation catalyst.

2. The process of claim 1 wherein the iridium catalyst is supported on a solid catalyst carrier.

3. The process of claim 1 wherein the acyclic dione is 2,5-hexanedione and the cyclic ether product is 2,5-dimethyltetrahydrofuran.

4. The process of claim 1 wherein the acyclic dione is 2,6-heptanedione and the cyclic ether product is 2,6-dimethyltetrahydropyran.

References Cited

UNITED STATES PATENTS

| 2,641,597 | 6/1953 | Goldberg et al. _ 260—346.1 XR |
| 2,650,236 | 8/1953 | Condon et al. _____ 260—346.1 |
| 3,050,533 | 8/1962 | Munro et al. _____ 260—346.1 |
| 2,866,766 | 12/1958 | Honn _____ 260—30.4 |

FOREIGN PATENTS

| 905,726 | 12/1945 | France. |
| 655,118 | 7/1951 | Great Britain. |
| 859,466 | 12/1952 | Germany. |

OTHER REFERENCES

Theilheimer, "Synthetic Methods of Organic Chemistry," vol. II, Interscience Pub., New York (1949), p. 23.

Theilheimer, "Synthetic Methods of Organic Chemistry," vol. III, Karger, New York (1949), p. 21.

HENRY R. JILES, *Primary Examiner.*

J. M. FORD, *Assistant Examiner.*